United States Patent
Hoeting et al.

(10) Patent No.: US 6,263,732 B1
(45) Date of Patent: Jul. 24, 2001

(54) MEASURING CUP

(75) Inventors: Michael G. Hoeting; Stephen C. Hoeting, both of Cincinnati, OH (US)

(73) Assignee: Bang Zoom Design, Cincinnati, OH (US)

(*) Notice: Subject to any disclaimer, the term of this patent is extended or adjusted under 35 U.S.C. 154(b) by 0 days.

(21) Appl. No.: 09/313,686

(22) Filed: May 18, 1999

(51) Int. Cl.⁷ ...................................................... G01F 19/00
(52) U.S. Cl. ............................. 73/427; 33/1 V; D10/46.2
(58) Field of Search .............................. 33/1 V, 1 F, 522, 33/679.1; 73/426, 427; 215/365, 366; D10/46.2; 222/23, 25, 26

(56) References Cited

U.S. PATENT DOCUMENTS

| | | | |
|---|---|---|---|
| 153,159 | * 7/1874 | Dinwiddie | 73/427 |
| 216,530 | * 6/1879 | Pfitzenmeier | 73/427 |
| D. 243,500 | 3/1977 | Cooper . | |
| D. 255,530 | 6/1980 | Daenen et al. . | |
| D. 259,460 | 6/1981 | Daenen et al. . | |
| D. 259,461 | 6/1981 | Daenen et al. . | |
| D. 259,462 | 6/1981 | Daenen et al. . | |
| D. 268,158 | 3/1983 | Doyel . | |
| D. 272,704 | 2/1984 | Smith . | |
| D. 292,381 | 10/1987 | Kowolik et al. . | |
| D. 292,492 | 10/1987 | Ross et al. . | |
| D. 293,770 | 1/1988 | Ross et al. . | |
| D. 294,213 | 2/1988 | Chasen . | |
| D. 302,920 | 8/1989 | Ancona et al. . | |
| D. 303,055 | 8/1989 | Prindle . | |
| D. 304,277 | 10/1989 | Wolff et al. . | |
| D. 304,301 | 10/1989 | Moss et al. . | |
| D. 321,328 | 11/1991 | Duquet | D10/46.2 |
| D. 330,863 | 11/1992 | Green | D10/46.2 |
| 423,018 | * 3/1890 | Young | 73/427 |
| 1,507,968 | * 9/1924 | Johnson | 73/427 |
| 1,564,470 | * 12/1925 | Crimmel | 73/427 |
| 1,722,101 | * 7/1929 | Little | 73/427 |
| 2,165,045 | * 7/1939 | Garside | 73/426 |
| 3,526,138 | 9/1970 | Swett et al. . | |
| 3,527,270 | 9/1970 | Weil . | |
| 4,073,192 | 2/1978 | Townsend | 73/429 |
| 4,283,951 | 8/1981 | Varpio | 73/426 |
| 4,566,509 | 1/1986 | Szajna . | |
| 4,834,251 | 5/1989 | Yu . | |
| 5,397,036 | * 3/1995 | Mainwald | 73/427 |
| 5,588,747 | 12/1996 | Blevins | 73/427 |
| 5,662,249 | 9/1997 | Grosse . | |

OTHER PUBLICATIONS

"Jigger Photographs: Having four (4) semi–columns formed in relief on inside wall, of four (4) different heights. Information concerning origin and (date is unknown)."

* cited by examiner

Primary Examiner—Christopher W. Fulton
(74) Attorney, Agent, or Firm—Wood, Herron & Evans, L.L.P.

(57) ABSTRACT

A measuring cup has at least one ramp formed in relief radially inwardly on the inside surface of the measuring cup sidewall. At least one ramp rises from about the bottom edge of the sidewall to about the top edge of the sidewall. The indicia on an upwardly directed surface of the at least one ramp allows a user to look downwardly into the measuring cup to visually detect the volume level of the contents in the measuring cup, thereby eliminating the need to look horizontally at the cup at eye level. Preferably the cup has two ramps, with at least one of standard units, and another with metric units.

1 Claim, 2 Drawing Sheets

MEASURING CUP

FIELD OF THE INVENTIONS

This invention relates to measuring cups. More specifically, this invention relates to a measuring cup having indicia viewable from above.

BACKGROUND OF THE INVENTION

Measuring cups are known. Measuring cups can be made from a variety of materials, including plastic, metal and glass. One of the most common measuring cups found on the market today is a transparent measuring cup made of Pyrex® which is resistant to sudden changes in temperature to which it may be submitted during use.

The utility derived from a measuring cup is related to the ease with which volumetric indicia on the measuring cup's wall may be read by a user. Of course, any suitable units of measurement may be used to indicate the level to which contents have risen within a measuring cup.

Traditional measuring cups have indicia marked upon the measuring cup wall in such a manner which sometimes makes the indicia difficult to read, depending upon how precise a measurement is needed, the materials from which the measuring cup is manufactured and the physical condition of the user, for example. In the case of a measuring cup which is made from transparent or translucent material, e.g., Pyrex®, the most precise way to measure the contents contained therein is to place the measuring cup upon a level surface, pour the contents to be measured into the measuring cup and then stoop down to the vertical level of the measuring cup to attempt to visually detect the bottom of a liquid meniscus or to a level surface of solid contents. An alternative method to read the level to which contents in a transparent or translucent measuring cup have risen is to lift the measuring cup to eye level and attempt to hold the measuring cup steady while visually detecting the volume. In either use, the observer is looking in a generally horizontal direction to detect the volume.

Prior art measuring cups that are opaque are more difficult to read than transparent or translucent measuring cups. In order to read the volume of contents held within an opaque measuring cup, a user must peer over the upper margin of the measuring cup to eyeball, as closely as possible, the level to which contents have risen, either by stooping to the measuring cup's level or by lifting the measuring cup to eye level.

While the above-described methods for determining the volume of contents in a measuring cup may seem simple enough for most users, these methods can prove to be difficult for others. Users with bad knees, a bad back, or arthritis, for example, may not only have substantial difficulty in stooping over to accurately read the volume of contents in a measuring cup placed on a level surface, but may also have just as much difficulty in lifting a measuring cup to eye level and holding the cup steady to read the volume of contents held therein. When precise measurement of the volume of contents within a measuring cup is critical to a task, the simple actions of bending over or lifting a measuring cup to eye level, which seem easy to some users, may become difficult and uncomfortable for others.

Measuring the volume of cooking ingredients using prior art measuring cups can also be frustrating. As mentioned above, it can be difficult for a user to stoop over to read the level of contents when placed on a level surface or when lifted to eye level. An unsteady hand not only makes the volume of contents difficult to determine when a measuring cup is lifted to eye level, but a user may spill contents or even drop the measuring cup when attempting to do so.

Measuring cups are not limited in their utility to the kitchen, of course. They may also be used for measuring proper ratios of solutions, e.g., antifreeze, the precise measurement of which is critical to its application and simplicity of determining a precise volume is necessary. Other common household solutions can be dangerous, e.g., toxic or caustic, and when a measuring cup is filled with these solutions, the possibility of spilling them within the proximity of a child or a pet greatly increases when a measuring cup must be raised to eye level to determine the volume of its contents.

It is an object of the present invention to simplify the way in which a person can accurately detect the volume of material held in a measuring cup.

It is another object of the invention to improve a measuring cup to make it more conductive to simplify an accurate volume determination.

SUMMARY OF THE INVENTION

The present invention achieves the above-stated objectives by including with a measuring cup at least one sloped ramp having an upwardly directed surface having indicia which is readily observable by an observer looking downwardly into the open end of the cup.

The structure simplifies volume determination because there is no need for the observer to move relative to the cup in order to look in a horizontal direction at the cup indicia. Thus, the possibility of spilling is reduced. Also, since the ramp preferably rises continuously and gradually from the bottom of the cup, a user who is filling the cup from above can actually see the volume indicia on the upwardly directed surface of the ramp while the cup is being filled, looking along the same line of sight generally used during filling. These advantages result from the ability to visually determine the volume of the cup by simply looking into the open upper end, and the gradual slope of the ramp.

According to a first preferred embodiment of the invention, the cup has a bottom wall and an encircling vertical sidewall, so that the cup is cylindrical in shape with an open upper end. Inside the cup, at least one ramp slopes continuously upward from the bottom wall toward the open upper end. The ramp includes an upwardly directed surface bearing printed volume indicia viewable through the open upper end to visually determine the volume of the cup contents. Preferably the cup has two ramps formed integrally along the sidewall, with one bearing standard units of measurement and the other bearing metric units. The two ramps have oppositely located bottom ends and oppositely located top ends. The cup also has a handle and a spout, with the handle located adjacent one ramp and the spout located adjacent another.

In a second embodiment, the sidewall is sloped somewhat, so that it is substantially vertical. The cup includes two integral, oppositely located ramps with adjacently located bottom ends and adjacently located top ends. The top ends feed toward the spout, and again, one ramp bears standard units and the other bears metric indicia.

With another embodiment, the cup can be formed of any suitable material and via any suitable process, although transparent and moldable material is preferred and manufactured using a molding process is also preferred.

These and other features will be more readily understood in view of the following detailed description and the drawings.

DETAILED DESCRIPTION OF THE PREFERRED EMBODIMENT

Figure 1:
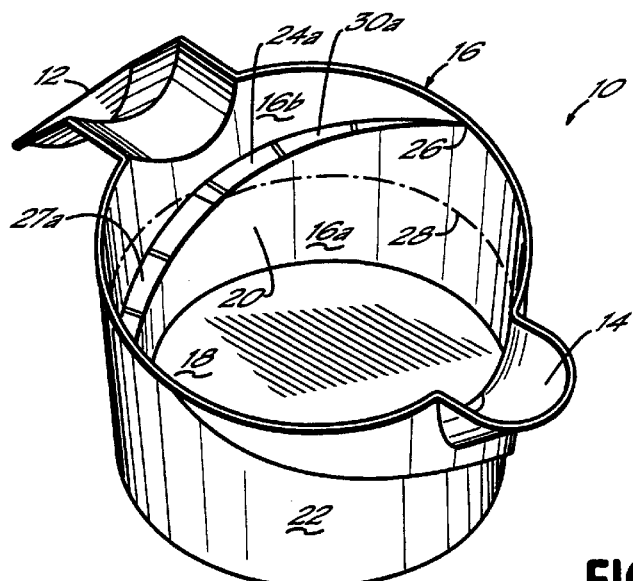
FIG. 1 is a perspective view of a measuring cup according to a first preferred embodiment of the invention
Figure 2:
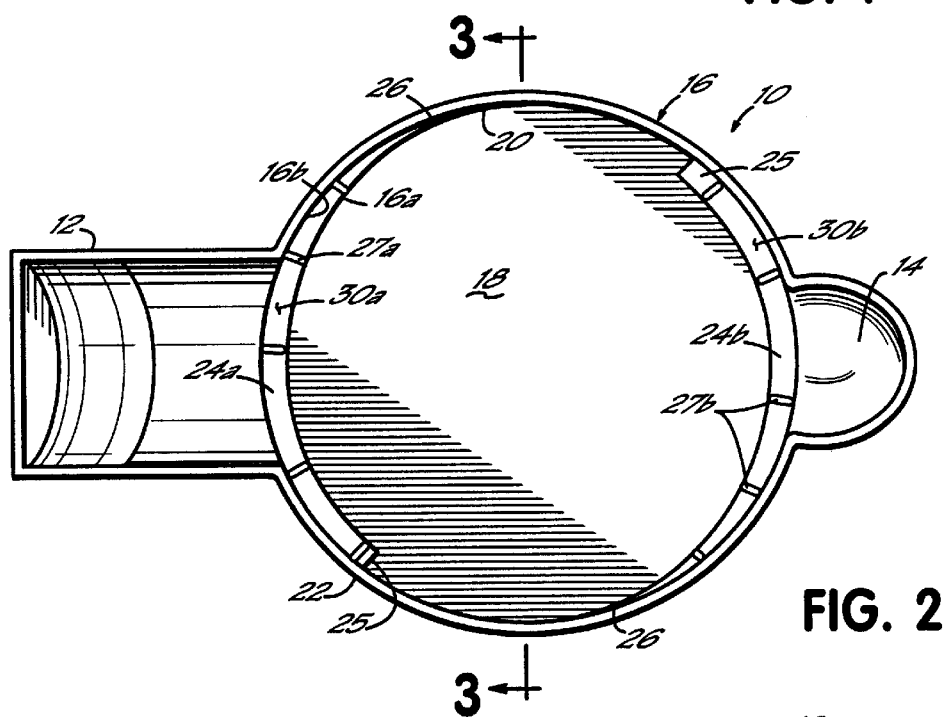
FIG. 2 is a top plan view of the measuring cup of FIG. 1
Figure 3:
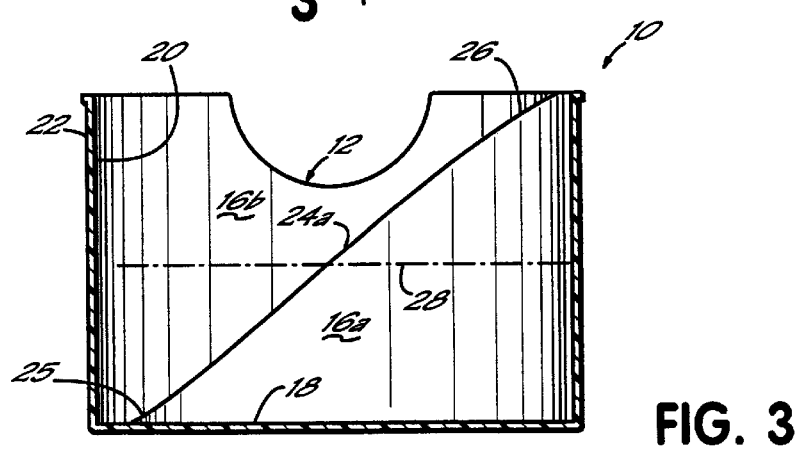
FIG. 3 is a cross-sectional view of the measuring cup of FIG. 2 taken along 3—3

FIGS. 1–3 show a first preferred embodiment of the present inventive measuring cup 10. Generally, the measuring cup 10 is integrally formed out of a suitable material and has a handle 12 and a spout 14 integrally attached to a substantially vertical sidewall 16. The measuring cup 10 has a base or bottom wall 18 integrally attached around its perimeter to the bottom edge of the sidewall 16. The cup 10 has an open upper end.

The wall 16 has an inside surface 20 and an outside surface 22 from which ramps 24a, 24b are formed in relief. The measuring cup 10 is molded from any suitable food grade plastic known in the art, however, it will be understood that the measuring cup 10 may be manufactured by any suitable process. It will also be understood that the measuring cup 10 may be made of any other suitable material known in the art, e.g., Pyrex®, metal.

The ramps 24a, 24b are located on opposite sides of the cup 10 but are identical in construction. Therefore, only one such ramp is described. Each ramp has a ramp base, or bottom end 25, and a ramp top or upper end 26. The ramp base 25 is located proximate the bottom edge of the sidewall 16, and the ramp top 26 is located proximate the top edge of the sidewall 16. The ramps 24a, 24b have respective ramp surfaces 30a, 30b, which are generally upwardly directed and have a substantially constant slope between the ramp base 25 and the ramp top 26. In the first preferred embodiment, the ramps 24a, 24b are oppositely disposed on the inside surface 20 of the wall 16. Also in the first preferred embodiment, the ramps 24a, 24b traverse substantially the same distance from the bottom margin of the wall 16 to the top margin of the wall 16 along the inside surface 20. It will be understood by those in the art that the ramps 24a, 24b may have a greater or lesser slope, which in turn would result in shorter or longer distances, respectively, traveled from the bottom margin to the top margin of the wall 16.

The ramps 24a, 24b have a slope great enough so that the ramps 24a, 24b do not extend more than half the circumference of the wall 16, as seen in FIG. 2. Also, the ramps 24a, 24b do not overlap each other. That is, the ramp 24a does not rise over the ramp 24b on the inside surface 20 of the wall 16. In the first preferred embodiment of the measuring cup 10, the sidewall 16 is substantially normal to the base 18, so that the cup 10 is generally cylindrical in shape. It will be understood by those in the art that the wall 16 may angle away from the perimeter of the base 18 so that the measuring cup 10 may receive a second measuring cup (not shown) therein, i.e., allow plural measuring cups 10 to stack inside each other.

Each of the ramps 24a, 24b is provided with volume indicia 27a, 27b, on the upwardly directed surface 30a, 30b, so a user may easily look down into the measuring cup 10 from above and view the volume level of the contents 28 within the cup 10. In the first preferred embodiment, the ramp 24a is provided with metric indicia 27a on ramp surface 30a, and ramp 24b is provided with standard indicia 27b on ramp surface 30b. It will be understood by those in the art that the indicia 27a, 27b may be spaced differently relative to each unit of measurement on respective ramps 24a, 24b, depending on the desired slope of the ramps 24a, 24b.

Figure 4:
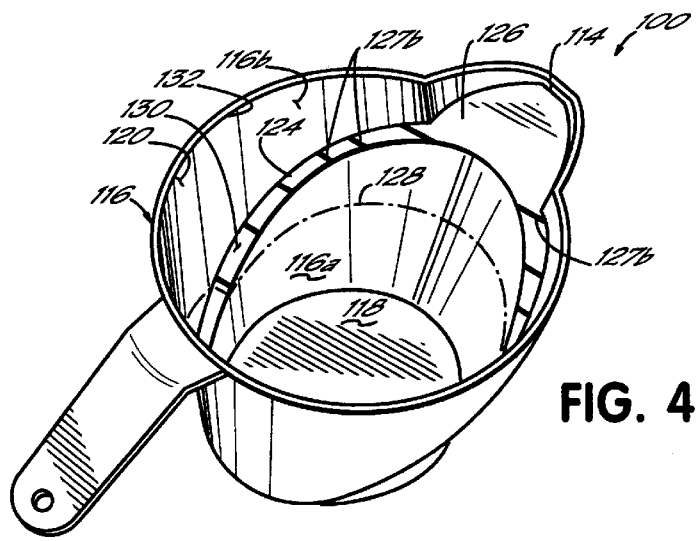
FIG. 4 is a perspective view of a second preferred embodiment of the inventive measuring cup
Figure 5:
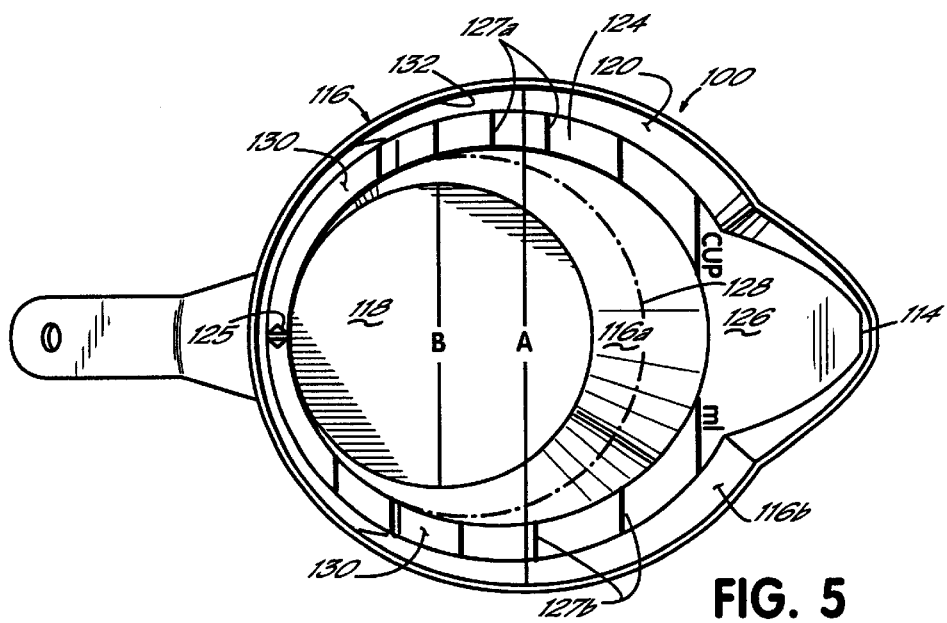
FIG. 5 is a top plan view of the measuring cup of FIG. 4
Figure 6:
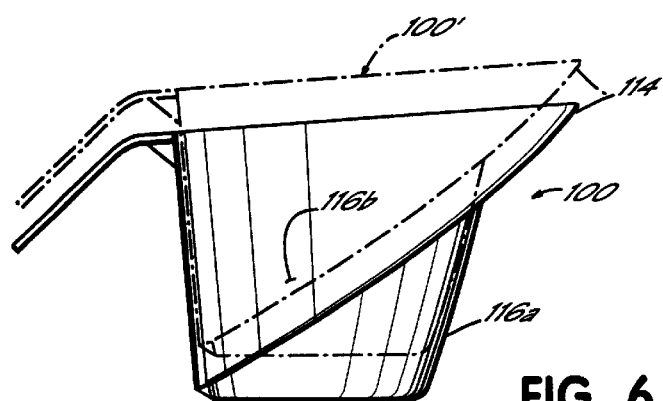
FIG. 6 is side view of the measuring cup and nesting feature of a second preferred embodiment of the present inventive measuring cup.

FIGS. 4–6 show a second preferred embodiment of an inventive measuring cup 100. The measuring cup 100 has a sidewall 116 with an open upper end 132 having a diameter A larger than the diameter B of the bottom wall or base 118. That is, the sidewall 116 slopes outwardly away from the base 118 as the sidewall 116 rises from its bottom edge to its top edge so that at least a second measuring cup 100' can be stacked within the measuring cup 100. The measuring cup 100 has a pair of oppositely located, but identically sloped ramps 124 which are substantially continuous around the sidewall inside surface 120 from the ramp bottom 125 to the ramp top 126. That is, both ramps 124 rise symmetrically along the inside surface 120 of the sidewall 116 from about the bottom edge of the sidewall inside surface 120 generally opposite the spout 114 to the top edge of the sidewall 116 adjacent to the base of the spout 114.

Because the aperture 132 has a greater diameter A than the diameter B of the base 118, the indicia 127a, 127b along the ramps 124 are not spaced in equal intervals. That is, a given rise in level of the contents 128 near the bottom edge of the sidewall 116 requires a smaller volume than an equal rise in the level of the contents near the upper edge of the sidewall 116. As a result, the indicia 127a, 127b are spaced upon the ramps 124 closer together near the top edge of the sidewall 116 than at the bottom edge for an equivalent volume of contents 128. It will be understood by those in the art that the progressive change in the diameter of the measuring cup 100 from the base 118 to the upper edge of the sidewall 116 may also be accommodated by decreasing the slope of the ramps 124 from the lower edge of the sidewall 116 to the upper edge of the sidewall 116 while maintaining the spacing between indicia 127a, 127b along the ramps 124.

Also in this embodiment, the ramp tops 126 are coextensive with spout 114 to allow a user to more easily pour contents from the measuring cup 100 without spilling.

The sidewall 116 has a lower portion 116a below the ramps 124 which is offset inwardly by the width of the ramp surfaces 130 from an upper portion 116b of the sidewall 116. This offset allows subsequent measuring cups (not shown) to nest within the measuring cup 100 and each other when stacked.

From the above disclosure of the detailed description of the present invention and the preceding summary of the preferred embodiment, those skilled in the art will comprehend the various modifications to which the present invention is susceptible. Therefore, I desire to be limited only by the scope of the following claims and equivalents thereof.

What is claimed is:

1. A measuring device, comprising:

a bottom wall and a generally vertical and encircling side wall having a lower edge and an upper edge, said sidewall defining an upwardly opening cup with an upper end;

a spout attached integrally to said sidewall; and a pair of continuously sloping ramps formed integrally with and radially inward in relief from said sidewall, said ramps extending from about said bottom wall generally opposite said spout toward said open upper end generally adjacent said spout, wherein said ramp is coextensive with said spout, said ramp having an upwardly directed surface and indicia located on said upwardly directed surface being at least one of standard and metric units of measurement providing a readily observable indication of the volume of the contents contained within said cup.

* * * * *